United States Patent [19]

Eschenburg

[11] Patent Number: 5,137,704
[45] Date of Patent: Aug. 11, 1992

[54] PROCESS OF DECREASING $NO_x$ CONTENT OF EXHAUST GASES

[75] Inventor: Jochim Eschenburg, Friedrichsdorf, Fed. Rep. of Germany

[73] Assignee: Metallgesellschaft Aktiengesellschaft, Frankfurt am Main, Fed. Rep. of Germany

[21] Appl. No.: 629,238

[22] Filed: Dec. 18, 1990

[30] Foreign Application Priority Data

Dec. 20, 1989 [DE] Fed. Rep. of Germany ....... 3942092

[51] Int. Cl.$^5$ .................. C01B 21/00; C01B 17/00; B01J 8/00
[52] U.S. Cl. ................... 423/235; 423/244
[58] Field of Search .............. 423/235, 235 D, 244 A, 423/244 R

[56] References Cited

U.S. PATENT DOCUMENTS 4,469,664 9/1984 Abelitis et al. ................ 423/244 A
4,634,583 1/1987 Wolter et al. ................ 423/244 A

FOREIGN PATENT DOCUMENTS 54-28777 3/1979 Japan ................... 423/239

*Primary Examiner*—Gregory A. Heller
*Attorney, Agent, or Firm*—Michael J. Striker

[57] ABSTRACT

For a decrease of $NO_x$ content in the exhaust gases from cement-burning kilns by an addition of ammonia and/or ammonia-containing substances to hot exhaust gases, the exhaust gases are desulfurized at a temperature from 50° to 100° C. in a dry or semidry process by a mixture of raw cement powder and calcium hydroxide, and the mixed solids which have been removed the exhaust gas in a dry state in the desulfurizing stage are returned to the exhaust gas stream when it is at a temperature from 850° to 1,000° C.

5 Claims, 1 Drawing Sheet

PROCESS OF DECREASING $NO_x$ CONTENT OF EXHAUST GASES

BACKGROUND OF THE INVENTION

The present invention relates to a process of decreasing the $NO_x$ content of the exhaust gases of cement-burning kilns by an addition of ammonia and/or ammonia-containing compounds to the hot exhaust gases, which are subsequently cooled with transfer of heat to the ground raw materials, dedusted in a manner known per se and finally desulfurized at 50° to 100° C. in a dry or semidry process by means of a mixture of raw cement powder and calcium hydroxide.

The elimination of nitrogen oxides in exhaust gases by an addition of ammonia and the desulfurization by calcium-containing substances are known (see Published German Application 35 26 008). The reactants are usually added in highly superstoichiometric proportions because it will not be possible otherwise to decrease the pollutant contents below the legally prescribed limits. If the reactants are separated from the exhaust gas stream regardless of whether or not they have been "consumed", is desulfurizing, the required surplus will primarily be an economic problem. If the reactants are gaseous, e.g., in the elimination of nitrogen oxides, an additional technological problem will arise because the ammonia added in a surplus is a pollutant in itself and, for instance in Switzerland, must not be emitted at a rate in excess of 30 mg/sm$^3$ (sm$^3$=standard cubic meter).

SUMMARY OF THE INVENTION

Accordingly, it is an object of the present invention to insure an effective elimination of nitrogen oxides and to ensure that the ammonia added to the exhaust gas in a surplus will be removed from the exhaust gas before the latter is delivered to the environment.

In keeping with these objects and with others which will become apparent hereinafter, one feature of the present invention resides, briefly stated, in a process of decreasing $NO_x$ content of exhaust gases in accordance with which mixed solids which have been removed from the exhaust gas in a dry state in the desulfurizing stage are returned to the exhaust gas stream when it is a temperature from 850° to 1,000° C.

In accordance with another feature of the present invention, ammonia and/or ammonia-containing compounds is or are added also at a temperature from 850° to 1,000° C.

Still another feature of the present invention is that the $NO_x$ content is decreased at an $NH_3:NO_x$ molar ratio from 1 to 2.

Still a further feature of the present invention is that the desulfurizing is effected by a mixture of 30 to 75% raw cement powder and 25 to 70% calcium hydroxide.

In accordance with a further feature of the present invention the desulfurizing is effected with a $Ca:SO_2$ molar ratio from 1 to 3.

Finally, the process can be used for decreasing $NO_x$ content in exhaust gases from power plant boilers, garbage-incinerating plants, etc., with the modification that the exhaust gases are cooled with a transfer of heat to the combustion air and dedusting is effected at a temperature in excess of 130° C.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In accordance with the present invention decreasing of the $NO_x$ content of the exhaust gases of cement-burning kilns is performed by an addition of ammonia and/or ammonia-containing compounds to the hot exhaust gases, which are subsequently cooled with transfer of heat to the ground raw materials, dedusted in a manner known per se and finally desulfurized at 50° to 100° C. in a dry or semidry process by means of a mixture of raw cement powder and of calcium hydroxide.

In accordance with the inventive feature the mixed solids which have been removed from the exhaust gas in a dry state in the desulfurizing stage are returned to the exhaust gas stream when it is at a temperature from 850° to 1,000° C.

It has surprisingly been found that a desulfurization effected at temperatures in the range from 50° to 100° C. by raw cement powder and of calcium hydroxide will have the result that the $SO_2$ will be chemically combined with Ca to the desired degree but a substantial part of the ammonia contained in the exhaust gas will be removed therefrom together with the solids which are collected. Because chemical compounds of ammonia with the desulfurizing reactants are not stable in that temperature range, most of the ammonia will be in an adsorbed state, which is not stable at elevated temperatures.

For this reason the ammonia which has been bound to the reaction products in the desulfurizing stage will be released as the reaction products are returned to the hot exhaust gases and the released ammonia will then be able to react with the nitrogen oxides. The addition of fresh ammonia may be restricted to the net consumption and the required surplus potential of ammonia is recirculated in accordance with the invention.

Ammonia and/or ammonia-containing compounds can be also added at a temperature of 850° to 1,000° C. in the inventive process.

The $NO_x$ can be decreased at an $NH_3:NO_x$ molar ratio from 1 to 2. The desulfurizing can be effected by a mixture of 30 to 75% raw cement powder and 25 to 70% calcium hydroxide. The desulfurizing can be effected with a $Ca:SO_2$ molar ratio from 1 to 3.

The process in accordance with the invention can also be used successfully for a decrease of the $NO_x$ content in exhaust gases from power plant boilers, garbage-incinerating plants, etc. But whereas the dust removed from the exhaust gas and the residues of the desulfurization of the exhaust gas will ultimately be incorporated in cement in the production of cement and need not be disposed of, the last-mentioned combusting processes will always provide residual materials at a considerable rate and such residual materials must be processed further and/or be ultimately dumped. In such processes the dedusting which precedes the desulfurization is carried out in accordance with the invention at a temperature in excess of 130° C. Only ash and reactants and reaction products of the desulfurizing stage are removed but $NH_3$ are not removed because a significant adsorptive binding to the solid particles are not effected in that temperature range and such binding can be used for an effective removal of NH₃ together with the solid particles from the exhaust gas stream only at temperatures below 100° C.

The solid particles which are removed from the gas stream in the desulfurizing stage contain ash, reactants and reaction products and adsorptively bound ammonia and in accordance with the invention are entirely returned to the hot exhaust gases. As a result, the ammonia is released so that it can react with the $NO_x$. Besides, $CaSO_3$ is oxidized to a higher degree and a certain predesulfurization is effected by the unused reactants. In the dedusting stage preceding the desulfurizing stage the $SO_2$ is removed from the exhaust gastreating system substantially as $CaSO_4$ together with small amounts of $CaSO_3$.

BRIEF DESCRIPTION OF THE DRAWING

The objects, features and advantages of the present invention will now be illustrated in more detail by the following detailed description, reference being made to the accompanying drawing in which.

EXAMPLE

Figure 1:
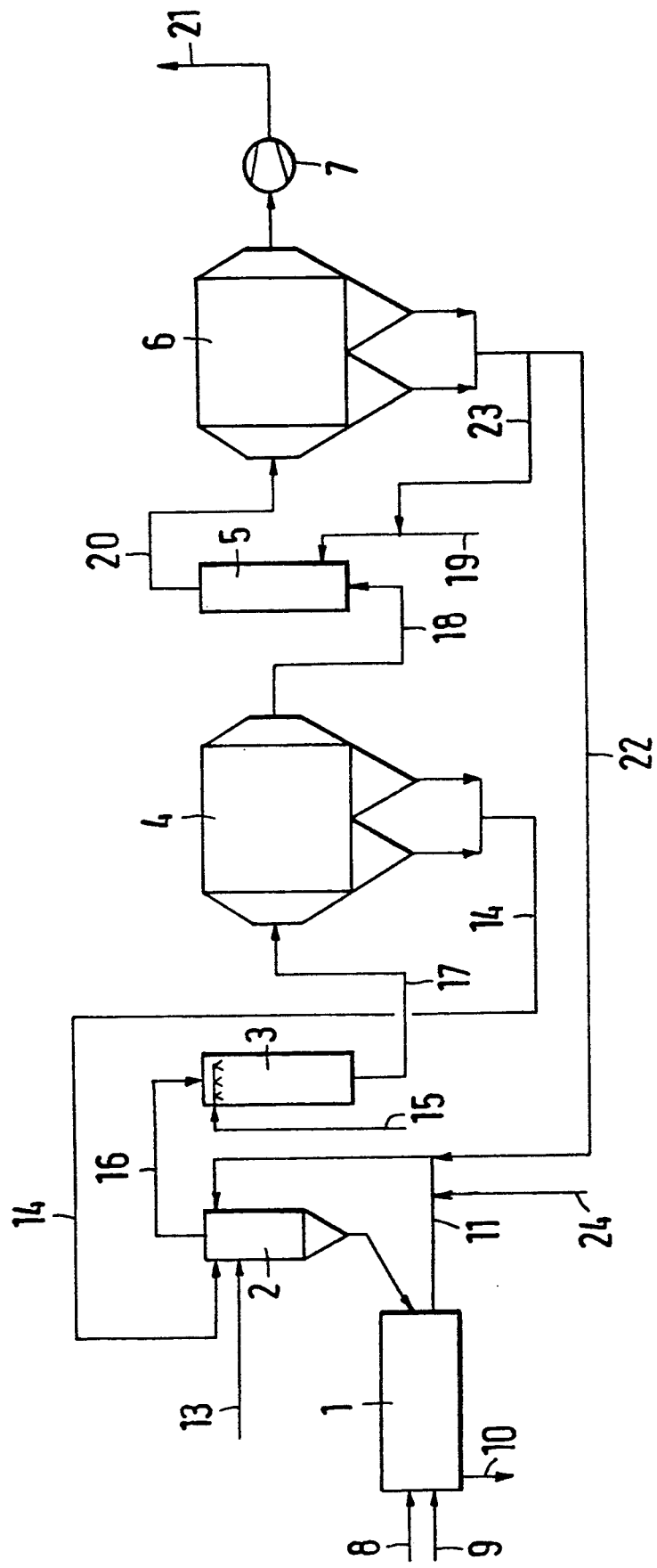
FIG. 1 is a schematic diagram of a plant for performing the process for decreasing the $NO_x$ content of exhaust gases according to the present invention.

FIG. 1 is a highly simplified representation of a cement-making plant which is provided in accordance with the invention with means for desulfurizing and for decreasing the nitrogen oxides content. A kiln 1 for burning cement is supplied through lines 8 and 9 with fuel and preheated combustion air. The exhaust gases leave the cement-burning kiln 1 through line 11, and the completely burnt cement clinker is supplied in line 10 to cooling means, which are not shown and in which the combustion air is heated.

The raw cement powder are supplied in line 13 to preheating means 2 and are preheated therein, in most cases in a plurality of stages, by the exhaust gases which come from the cement-burning kiln 1 through line 11. The exhaust gases are delivered in line 16 to an evaporative cooler 3, which is supplied with a liquid coolant at a controlled rate through line 15 for a control of the exhaust gas temperature. The exhaust gases are subsequently dedusted in a dedusting electrostatic precipitator 4 and the collected dust is returned via line 14 to the preheating means 2.

The exhaust gases are then delivered in line 15 to the desulfurizer, which consists of a spray absorber 5, a line 20, a dedusting electrostatic precipitator 6 and a line 23. Alternatively, a circulating fluidized bed system consisting of a reactor, separator and recycling line might be used here. The required fresh reactant composition is supplied through line 19 and for an improved utilization is recirculated in the desulfurizer. The exhaust gas is finally delivered to the atmosphere by the fan 7 and the line 21.

That part of the reaction product collected in the dedusting electrostatic precipitator, which is not maintained in circulation, is supplied through line 22 to line 11, i.e., in accordance with the invention is added to the exhaust gas stream where the latter is at temperatures from 850° to 1,000° C. At that location the exhaust gas is supplied through line 24 with the ammonia which is required for replenishing.

The process in accordance with the invention is based on the recognition that a very considerable part of the ammonia, which is present in excess for an effective decrease of the content of nitrogen oxides, can be removed from the exhaust gas together with the reaction products of the "cold" desulfurization so that the ammonia content of the purified exhaust gas can easily be kept below the prescribed limits. Because the reaction product is returned to the exhaust gas stream where it is at a temperature between 850° and 1,000° C., the adsorptively bound ammonia is released so that it is available for elimination of nitrogen oxides from the exhaust gas. As a result, the elimination of nitrogen oxides can be effected at a very highly overstoichiometric concentration and without an occurrence of excessively high residual ammonia concentration in the purified exhaust gas. The reactants for the desulfurization are recirculated through line 23, the spray absorber 5, the line 20 and the dedusting electrostatic precipitator 6 and a circulating stream containing ammonia in a high surplus will be maintained through line 20 and the units 2 to 6 so that an effective elimination of nitrogen oxides will be achieved.

In a trial application of the process in accordance with the invention, an exhaust gas at a rate of 220,000 $sm^3/h$ was treated for an elimination of nitrogen oxides and was desulfurized at 63° C. In that case a fluidized bed system consisting of a reactor, separator and recycling line was used as well as a reactant composition consisting of about 65% raw cement powder and about 35% calcium hydroxide.

The ground raw materials had such a sulfur content that the exhaust gas to be desulfurized contained 2.8 $g/sm^3$ $SO_2$ and 80 $mg/sm^3$ ammonia. The desulfurizer was so controlled that the purified gas contained less than 500 mg $SO_2$ per $sm^3$ and the ammonia content had been decreased from 80 to less than 4 $mg/sm^3$. This corresponds to a removal of more than 95% of the ammonia content.

Fresh reactant composition was required at a rate of 100 $g/sm^3$ and fresh ammonia at a rate of 0.04 $g/sm^3$. Solids at a rate of about 2,150. kg/h were collected in the deduster which was the first in the direction of gas flow and were returned to the means for preheating the ground raw materials. NH₃-containing solids approximately at the same rate were collected in the second deduster and were returned to the hot exhaust gases.

It will be understood that each of the elements described above, or two or more together, may also find a useful application in other types of processes differing from the types described above.

While the invention has been illustrated and described as embodied in a process of decreasing $NO_x$ content of exhaust gases of cement-burning kilns, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process of decreasing $NO_x$ content of exhaust gases of a cement-burning kiln, comprising the steps of:
   a) adding a substance selected from the group consisting of ammonia, ammonia-containing compounds and mixtures thereof to the exhaust gases of the cement-burning kiln at a temperature from 850° to 1000° C.;

b) subsequently cooling the exhaust gases with transfer of heat to ground raw materials;

c) dedusting the exhaust gases;

d) desulfurizing the exhaust gases at 50° to 100° C. with a mixture of 30 to 75% raw cement powder and 70 to 25% calcium hydroxide to form mixed solids and desulfurized exhaust gas;

e) removing the mixed solids from the exhaust gases in a dry state in desulfurizing step d); and f) returning the mixed solids removed in step e) to the exhaust gases prior to step d) and when the exhaust gases are at a temperature from 850° to 1,000° C.

2. A process according to claim 1, wherein the adding of the compound to the exhaust gases is performed with an $NH_3:NO_x$ molar ratio from 1 to 2.

3. A process according to claim 1, wherein said desulfurizing is performed with a $Ca:SO_2$ molar ratio from 1 to 3.

4. A process of decreasing $NO_x$ content of exhaust gases from a power plant boiler, comprising the steps of adding a substance selected from the group consisting of ammonia, ammonia-containing compounds and mixtures thereof to the exhaust gases at a temperature from 850° to 1000° C.; subsequently cooling the exhaust gases with transfer of heat to combustion air, dedusting the exhaust gases; desulfurizing the exhaust gases in excess of 130° C. with a mixture of 30 to 75% raw cement powder and 70 to 25% calcium hydroxide to form mixed solids and desulfurized exhaust gases; removing the mixed solids from the exhaust gases in a dry state during the desulfurizing; and returning the mixed solids so removed to the exhaust gases when the exhaust gases are at a temperature of from 850° to 1,000° C.

5. A process of decreasing $NO_x$ content of exhaust gases from a garbage-incinerating plant, comprising the steps of adding a substance selected from the group consisting of ammonia, ammonia-containing compounds and mixtures thereof to the exhaust gases at a temperature from 850° to 1000° C.; subsequently cooling the exhaust gases with transfer of heat to combustion air, dedusting the exhaust gases; desulfurizing the exhaust gases in excess of 130° C. a mixture of 30 to 75% raw cement powder and 70 to 25% calcium hydroxide to form mixed solids and desulfurized exhaust gases; removing the mixed solids from the exhaust gases in a dry state during the desulfurizing; and returning the mixed solids so removed to the exhaust gases when the exhaust gases are at a temperature of from 850° to 1,000° C.

* * * * *